C. WHEELER.
Bee Hive.
No. 4,087.
Patented June 20, 1845.
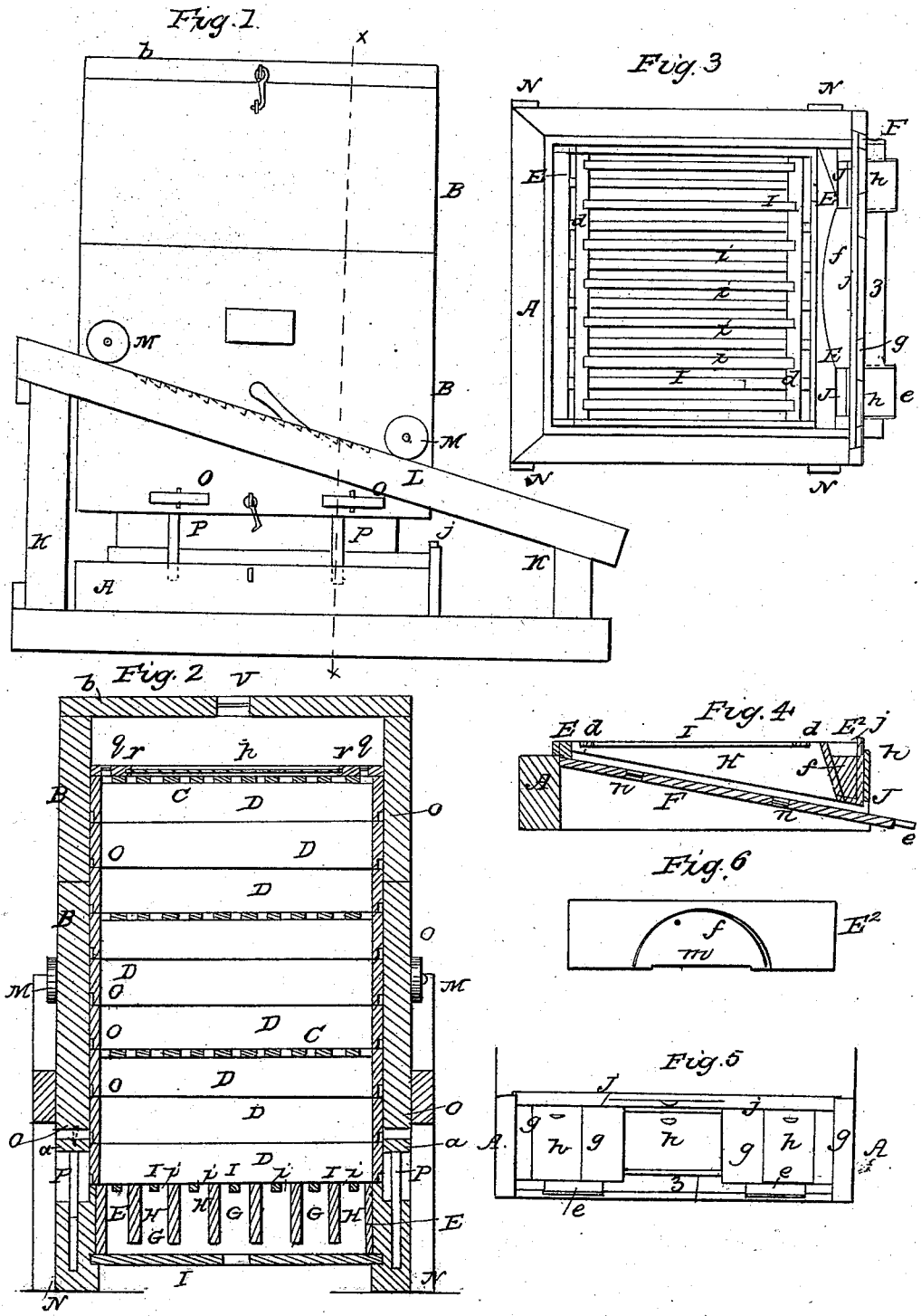

UNITED STATES PATENT OFFICE.

CLARK WHEELER, OF LITTLE VALLEY, NEW YORK.

BEEHIVE.

Specification of Letters Patent No. 4,087, dated June 20, 1845.

*To all whom it may concern:*

Be it known that I, CLARK WHEELER, of Little Valley, in the county of Cattaraugus and State of New York, have invented a new and useful Improvement in Beehives, which is described as follows, reference being had to the annexed drawings of the same making part of this specification.

Figure 1 is a side elevation of the hive. Fig. 2 is a vertical section of ditto at the line $x\ x$ of Fig. 1. Fig. 3 is a top or bird's eye view of the base and lower box, containing the bars. Fig. 4 is a vertical section of ditto. Fig. 5 is a front view of ditto. Fig. 6 is a front view of the inclined board showing the entrance covered by the semicircular cap.

This bee hive consists of a suitable base A, upon which is placed a vertical range of rectangular boxes B, open at top and bottom, except the upper one which is covered by a board $b$ and containing another range of rectangular boxes D Fig. 2 each being about one third the height of the upper box B of the outer range, and also open at top and bottom, except the tops of every third one in which are placed a range of horizontal parallel, rectangular pieces, of wood, or slats C, let into grooves in the upper edges of every third box, so that they can be removed at pleasure, one and all, for the purpose of separating the various qualities of honey and comb therefrom, and when in their proper places serving for the bees to attach their comb thereto. These boxes rest on the upper edges of the base of the hive, and the lower one nearly touches the upper edges of a box E, of a corresponding size, having an inclined bottom F Figs. 2 and 4 which projects beyond the sides of the box E, and enters inclined grooves formed in the inner sides of the base A, and is divided into a series of chambers G to receive the drones by cross bars H, a sufficient space being left between the inclined bottom F of the box E, and the bottom of the bars H, to allow the bees to pass from one chamber to another, each of which chambers G is partially covered by a slat I, arranged between, and parallel to, the bars H and secured at each end to cross pieces $d$ countersunk in the bars H, the whole forming a screen I', as represented in Fig. 3, which can be removed at pleasure. The object of this screen is to make the communications, $i$, between the lower chambers G and main-body of the hive D' just large enough to allow the working bees to go through, but too small for the drones to pass, and to keep the drones in the chambers G, adjacent to, and in sight of, the working bees while performing their work. The drone bees already in the hive, being unable to pass through the communications $i$ between the chambers G and working part of the hive, will seek an opening elsewhere, and pass through the openings J, in the inclined bottom board F (closed when required by slides $e$), which, from their peculiar position being beneath the front of the hive and the slides cannot be seen by the bees from the outside. When the drones again attempt to enter the hive, they will by instinct join the working bees, and pass with them through the main entrance Z Figs. 4 and 5 to the lower chambers G, where they will remain, being prevented from going farther by the screen I.

The working capacities of the hive may be increased, when desired, by placing the hive between the sides of a frame K, having an inclined way L, on top, upon each of which two wheels M, (secured on each side of the hive, on the same inclined line as the ways) move, and grooves formed in the lower timber of the same, in which enters corresponding tongues or projections N formed on the lower part of the base A. When it is desired to increase the dimensions of the hive, a tin slide, whose edges move in grooves $a$, in the lower box of the hive, is placed between the lower interior box D and the box E, containing the chambers G to prevent the bees escaping, and the buttons or thumb levers $O^2$ are pushed into the recesses $o$ formed in the sides of the interior boxes, and the whole hive is moved backward. The projections N, on the lower part of the base, running in the horizontal grooves, in the lower parallel timbers of the frame K, will hold the base A, of the hive, in the same horizontal line, and the wheels M, running on the inclined ways L will cause the main body of the hive, to ascend (carrying with it the interior boxes D), until the space between the lower box D of the hive, and the box E containing the chambers, G, is sufficient to admit another box. When one is introduced, the tin slide is removed, and the thumb levers or buttons $O^2$ withdrawn from the recesses in the interior boxes D; and the two parts of the hive are again brought together, by running the hive forward, toward the lower end of the inclined ways. A number of pins P, being secured to the lower edges of the lower box of the outside range B, and entering corresponding openings in the upper edges of the base A after the manner of dowel pins, for the purpose of guiding or keeping the main body of the hive, immediately above the base, during its ascent, and descent.

The front $E^2$ of the box E, inclines upward and backward from the bottom, at an angle of about 55° with a horizontal plane, more or less, or at any suitable angle, having a recess or space $m$, Fig. 6, left in the lower edge of said inclined side, for the entrance of the bees, covered by a semi-oval or semi-circular end, also recessed on its lower edge to correspond with the recess before mentioned for the ingress and egress of the bees—the convex edge of said end being covered with a thin dome or cap $f$, to prevent the bees from passing from the said central entrance, to the side exits J before mentioned.

The front of the base A is made in the form of a vertical slide $g$, Fig. 5, and is placed in vertical side grooves so that it can be removed at pleasure, for the purpose of withdrawing the box E or for any other purpose. It is also provided with several vertical sliding doors $h$, designed to be raised or lowered for the purpose of increasing or diminishing the space for the ingress and egress of the bees. There is also a narrow slide $j$, Figs. 3, 4 and 5, placed on the top of the before mentioned slide $g$, for the purpose of forming when raised an entrance at the top of the box E, and also for opening a way for the insertion of the tin slide before mentioned. It is simply a rectangular board with its ends dovetailed or otherwise shaped. The length of the cards or combs of honey can be increased or decreased at pleasure, by using more or less of the slatted boxes.

A pane of glass $p$ in a rectangular frame $r$ having ventilating holes $q$ therein may be placed over the upper box of the inside-tier, to prevent the bees ascending to sting the aparian, while viewing their operations.

The boxes, when moved up the inclined planes, are held by pawls attached to the sides of the boxes, that drop into notches on the inclined ways. There is a ventilator V in the top $b$ of the hive and two ventilators $n$, Fig. 4, in the inclined bottom. The inclined bottom F can be withdrawn at pleasure for cleaning it, or for destroying the drone bee, or for any other purpose, by sliding in the aforesaid grooves, first removing the vertical slide ($g$) containing the doors $h$. The outside boxes B can be removed at pleasure for exposing the boxes D, or for the facility of access to them for cleaning them, or for getting at the honey, or for any other purpose.

This hive being constructed double in the manner described, will be warm in winter and cool in summer.

What I claim as my invention and which I desire to secure by Letters Patent is—

1. The mode of entrapping the drone bees in the lower box E, of chambers G, within sight of, and adjacent to the working bees, by means of the additional screen I, in combination with the openings J, in the inclined bottom F of the box E, whose outlets are out of sight of the bees from the outside, and through which the drones are caused to pass from the inside of the body of the hive, as set forth.

2. I likewise claim the manner of extending the working capacities of the hive, by means of the inclined plane or way L, and groove in the lower part of the frame K, operating on the wheels M, secured to the upper section of the hive, and the tongue or projection N, on the lower part of the base A, on the principle of a wedge, and raising the upper section with the interior boxes, sufficiently high from the lower section to admit the insertion of another box below the inner range of boxes D as set forth.

3. I also claim the arrangement of the entrance Z, in combination with the drone trap, as described.

4. I likewise claim the combination of the inner tier of boxes, with the outer range of hives, elevated by the inclined planes as set forth.

CLARK WHEELER.

Witnesses:
EDMUND MAHER,
A. E. H. JOHNSON.